United States Patent

[11] 3,628,498

| [72] | Inventor | Adolph H. Kleinsorge<br>Affton, Mo. |
|---|---|---|
| [21] | Appl. No. | 13,726 |
| [22] | Filed | Feb. 24, 1970 |
| [45] | Patented | Dec. 21, 1971 |
| [73] | Assignee | W. B. Knight Machinery Co.<br>St. Louis, Mo. |

[54] OPTICAL READER ASSEMBLY
9 Claims, 7 Drawing Figs.

[52] U.S. Cl. ................................................. 116/115,
33/125, 116/115.5, 350/114, 353/41
[51] Int. Cl. ......................................................... G01p 13/00
[50] Field of Search ............................................. 33/68, 70 B,
125; 116/115, 115.5; 353/41; 356/138; 350/114,
115, 116

[56] References Cited
UNITED STATES PATENTS

| 2,278,945 | 4/1942 | Reason et al. | 33/125 |
| 2,978,953 | 4/1961 | Rantsch | 353/41 |
| 3,070,888 | 1/1963 | Gottesmann | 33/125 |
| 3,238,838 | 3/1966 | Gottesmann | 350/114 X |

*Primary Examiner*—Louis Capozi
*Attorney*—Stevens, Davis, Miller & Mosher

ABSTRACT: An optical reader assembly for accurately determining the angular position of a rotary worktable or the like regardless of the diameter of the worktable. The position of the optical reader is adjusted by a micrometer with movement of the micrometer stem translated to movement of the optical reader tangentially to the periphery of the worktable. To enable the assembly to be utilized with worktables of different diameters, adjustable cam means regulate the amount of movement of the optical reader occasioned by a predetermined movement of the micrometer stem.

INVENTOR
ADOLPH KLEINSORGE

BY *Stevens, Davis, Miller & Mosher*
ATTORNEYS

INVENTOR
ADOLPH KLEINSORGE

BY *Stevens, Davis, Miller & Mosher*
ATTORNEYS

INVENTOR
ADOLPH KLEINSORGE

BY *Stevens, Davis, Miller & Mosher*
ATTORNEYS 3,628,498

OPTICAL READER ASSEMBLY

BACKGROUND OF THE INVENTION

The present invention relates to an optical reader assembly for determining the angular position of a rotary worktable or the like with a high degree of accuracy.

It is a primary object of the present invention to provide a novel optical reader assembly which may be employed to determine the position of rotary worktables of different sizes by a simple adjustment.

In general, prior art systems had to be designed for the particular diameter of the worktable and were especially built for that particular diameter. According to one prior art approach, it is known to locate circular glass or metal scales at the center of rotation of the table and to read the scales optically. However, the space inside the rotary device frequently must be used for gears, etc., and is not available for this purpose. Also, the optical magnification system must be designed for many different diameters in order to be used on tables of different diameters. Large diameters can be a limiting factor in such a system.

It has also been known for many years to read graduations on the periphery of rotary devices. The problem is in breaking a degree down into minutes and seconds so that high accuracy can be obtained. The linear distance between the degree lines will vary with the diameter of the device that the lines are inscribed on. It is known to employ filar microscopes with built-in scales to break the degree down. The linear variations can be compensated for by moving the micrometer closer or away from the scale graduations but this is a very limited adjustment. Filar microscopes are very difficult to read and require the eye to be close to the instrument. Graduated scales inside the instrument must then be read and counted to obtain the minutes reading and it is very difficult to read seconds. These instruments cannot be read from a distance greater than several inches.

Another prior art approach is to engrave a steel band with lines and numbers while the band is in its linear state. This band is then stretched around the periphery of a rotating device of a given diameter and read optically. The band stretching must be done with utmost care and frequent checks are necessary to assure even stretching. Also, the band can be used only on a particular diameter and the diameter must be very close to the specified size so that each diameter rotary device must have a specially designed system. This approach is also subject to the disadvantage that the steel bands are rather fragile and can be bruised and ruined by being bumped with a tool or workpiece. Such a bruise can cause distortion in the band and can cause many or all of the graduations of the scale to move from their true position.

SUMMARY OF THE INVENTION

In accordance with the present invention, the periphery of a rotary worktable or similar device whose angular position is to be sensed is coated with stainless steel or other noncorrosive material by welding. The final finishing of this surface is done after assembly so that the table rotates on its own bearing. This assures a very true running surface and the size of the diameter of the table is unimportant. Three hundred sixty lines are inscribed on a periphery of the table, one for each degree.

An optical reader or magnifier is positioned at the periphery of the worktable and is connected to a slide mechanism which enables the optical reader to reciprocate essentially tangentially to the periphery of the table. The slide mechanism of the optical reader is reciprocated by a mechanism which translates movement of a micrometer stem into movement of the slide mechanism via an adjustable cam. The position of the cam determines the magnitude of movement of the slide mechanism and hence of the optical reader occasioned by a predetermined movement of the micrometer stem. When initially installing the optical reader assembly, the system is calibrated by adjusting the position of the cam so that movement of the optical reader in an amount corresponding to 1° on the periphery of the rotary table corresponds to movement of the micrometer 1° or 60 minutes on its scales. The position of the cam is adjusted manually by trail and error until the above-described relationship is achieved.

Since the optical reader travels on a straight line and the scale graduations are on a circle, there will be a very slight error existing in the linear measurement. For most applications this error is very small and can be ignored. For maximum accuracy, this error can be compensated for when manufacturing the cam by appropriately contouring its surfaces.

The above and other objects, features and advantages of the invention will become more apparent as this description proceeds.

Figure 1:
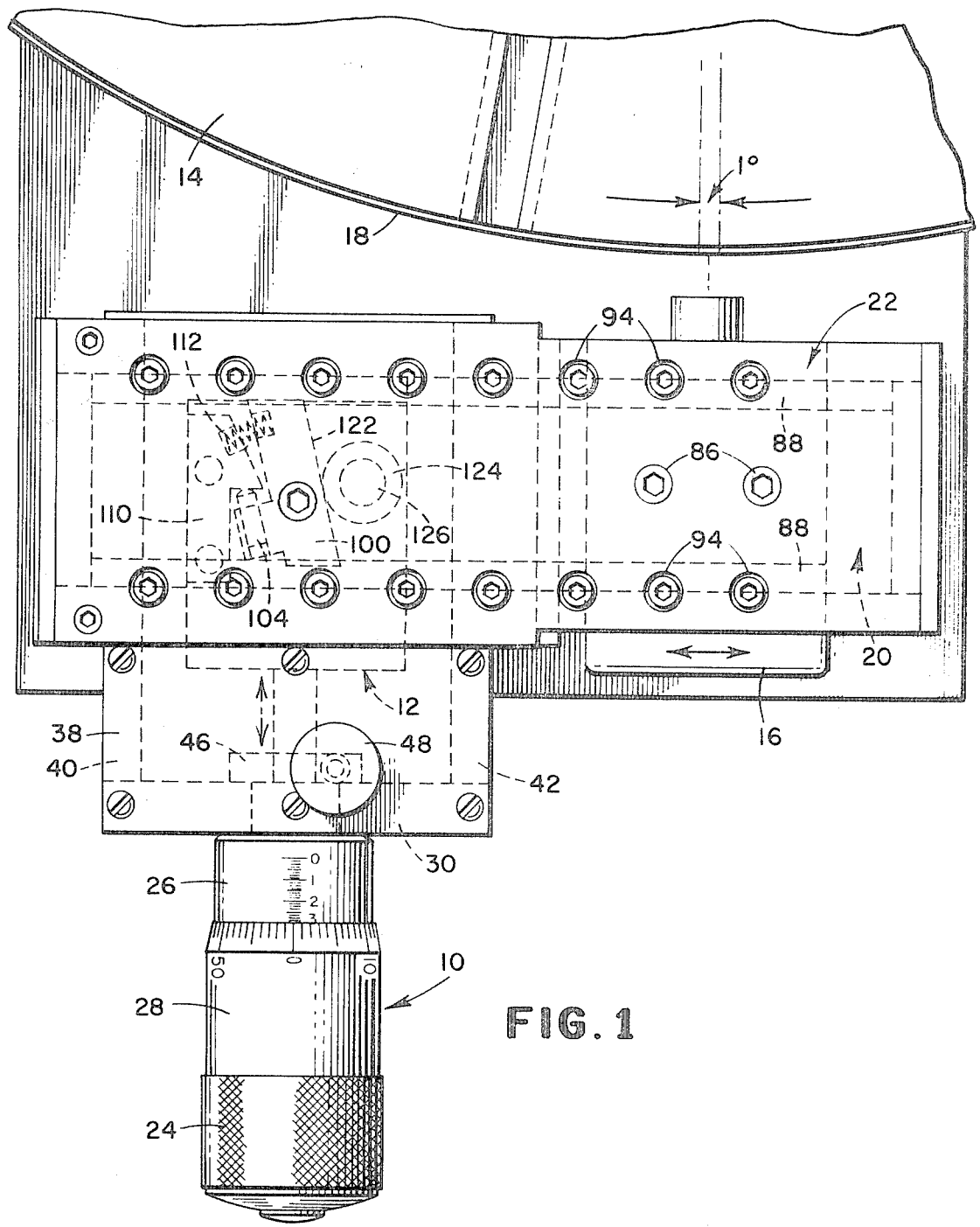
FIG. 1 is a plan view of a presently preferred optical reader assembly of the present invention.

Referring now to the drawings, the principal components of the system comprise a micrometer 10, a carriage assembly 12 which is reciprocated by the stem of the micrometer, an optical reader or magnifier 16 positioned to read the indicia on a scale 18 on the periphery of a worktable 14, and a slide assembly 20 which reciprocates within a housing 22 at right angles to the direction of reciprocation of the micrometer carriage assembly in order to vary the position of the optical reader.

The micrometer 10 includes at its outer end a knurled handle 24 for changing the position of the micrometer, a central member 26 carrying a minutes scale, an outer cylindrical member 28 which telescopes onto central member 26 and which has along its periphery a scale divided into 60 units which constitutes the seconds scale. The micrometer is held in position by a pair of upper and lower wall sections 30 and 32 having complementarily shaped recesses for receiving a cylindrical element 34 which projects from the scale-carrying member 26 and which houses the micrometer stem 36.

A housing for the micrometer stem is formed by the upper and lower wall sections 30 and 32, a cover plate 38, sidewalls 40 and 42, and a bottom frame member 44 which are screwed or otherwise suitably connected to each other.

Figure 7:
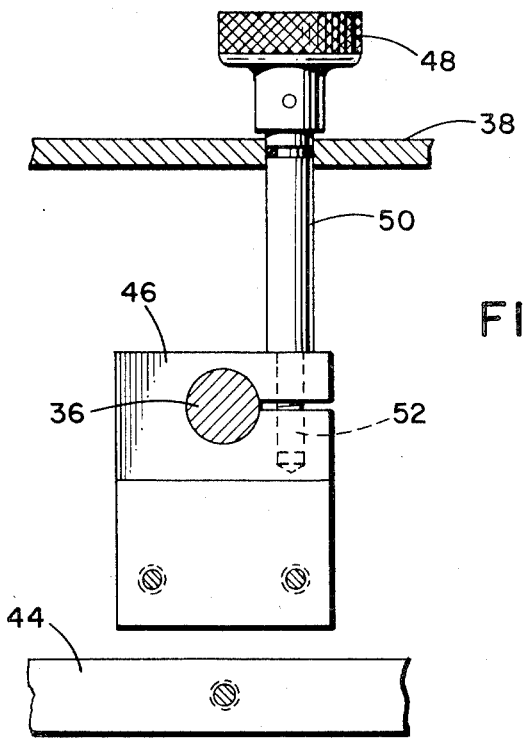
FIG. 7 is a vertical cross-sectional view taken on the line 7—7 of FIG. 6 showing means for clamping the micrometer shaft.

A clamp 46 surrounds the micrometer stem 36 and is secured to the lower wall section 32. As is best seen in FIG. 7, the clamp may be tightened to hold the micrometer in a desired setting by rotating a locking knob 48 disposed above cover plate 38. Knob 48 is connected to a stem 50 which has a threaded lower end 52 engaging the lips of clamp 46 to move the lips into and out of clamping engagement with the micrometer stem.

The forward end of the micrometer stem 36 is connected to the carriage 12 by a collar 54 and a thrust bearing 56 which are disposed on a projection 58 at the end of micrometer stem 36 within a recess 60 in the carriage 12. A retainer spring plate 62 holds the collar and thrust bearing within the recess 60. The end of projection 58 abuts against a carbide ball 64 which is in contact with a longitudinal pin 66 disposed in a bore passing through the carriage 12. The position of pin 66 may be adjusted by a setscrew 68.

Figure 5:
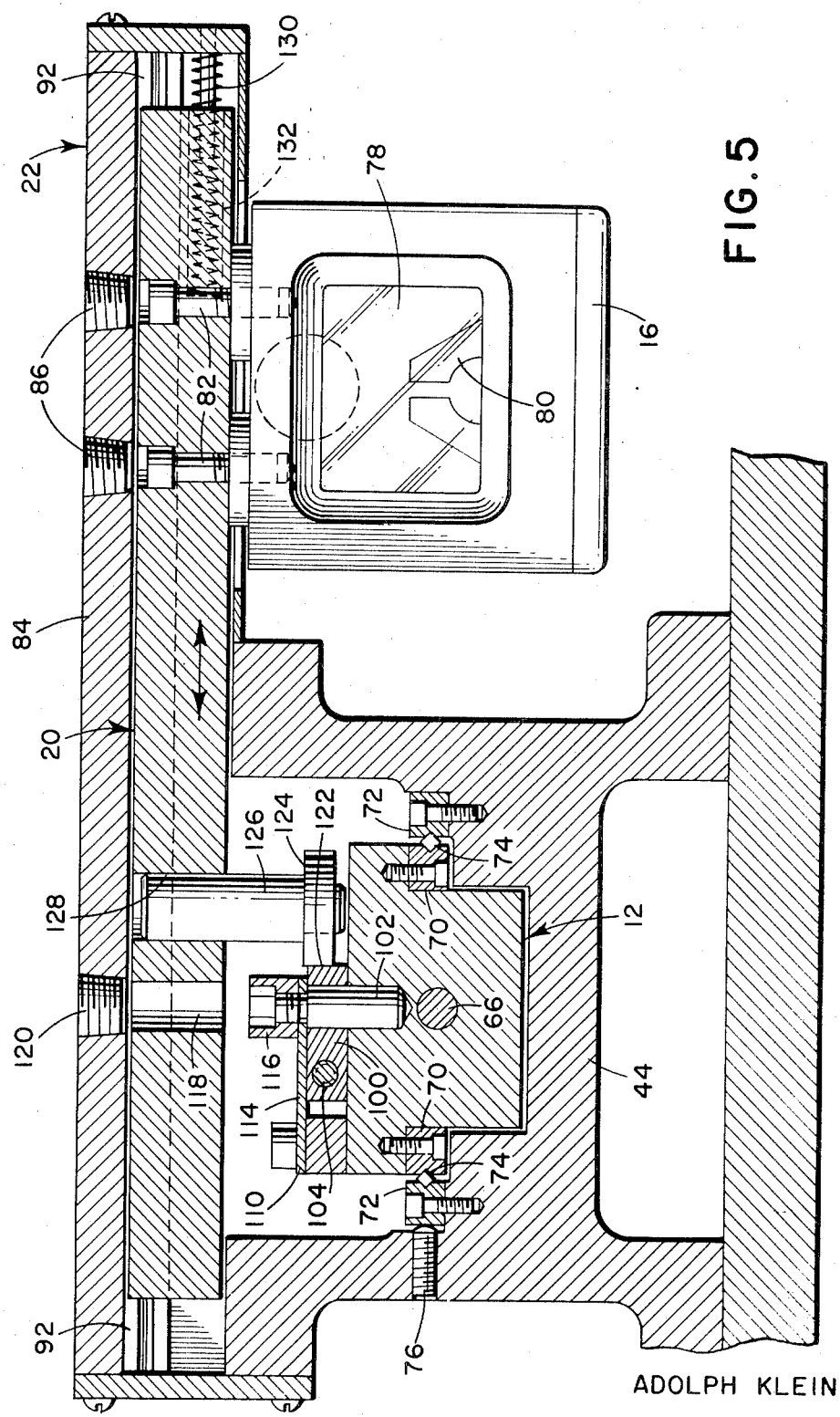
FIG. 5 is a vertical cross sectional view taken on the line 5—5 of FIG. 4.

Referring to FIG. 5, it will be seen that the carriage 12 is positioned to reciprocate upon support 44 by means of an antifriction system comprising at each side of the carriage ways 70 bolted to carriage 12 and ways 72 bolted to the support 44 with antifriction rails 74 disposed in complementarily shaped recesses in each pair of ways 70, 72. As show at the left-hand side of FIG. 5, setscrews 76 may be utilized to adjust the position of the rail 72 slightly to compensate for wear.

Figure 2:
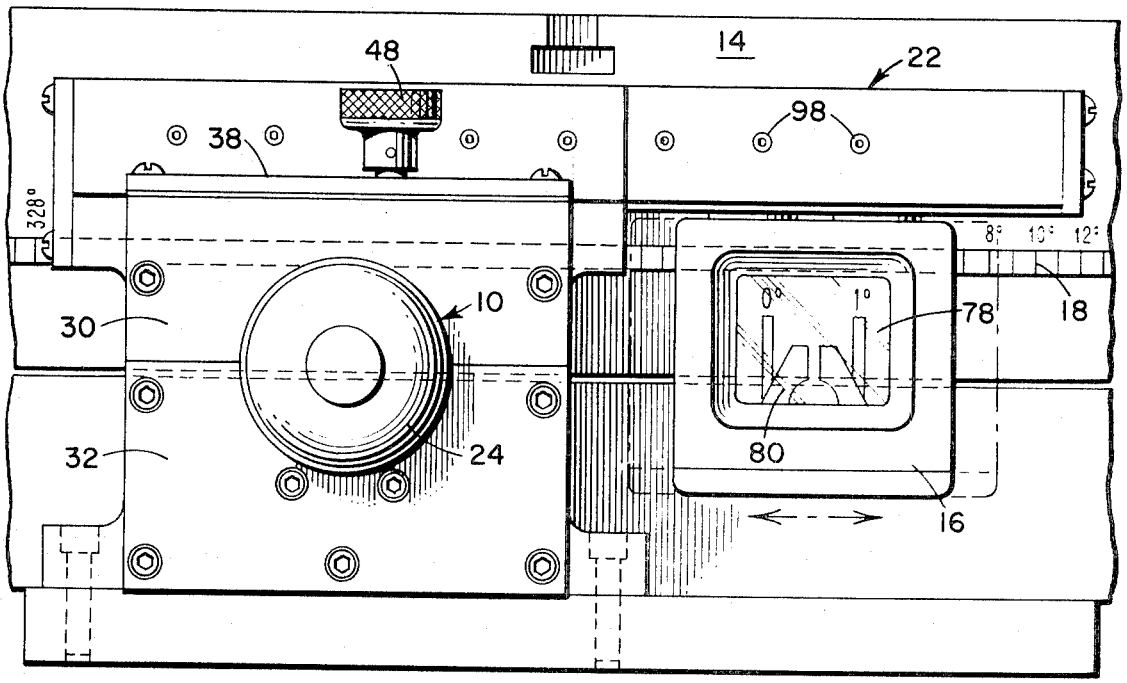
FIG. 2 is a front view of the optical reader assembly of FIG. 1.
Figure 3:
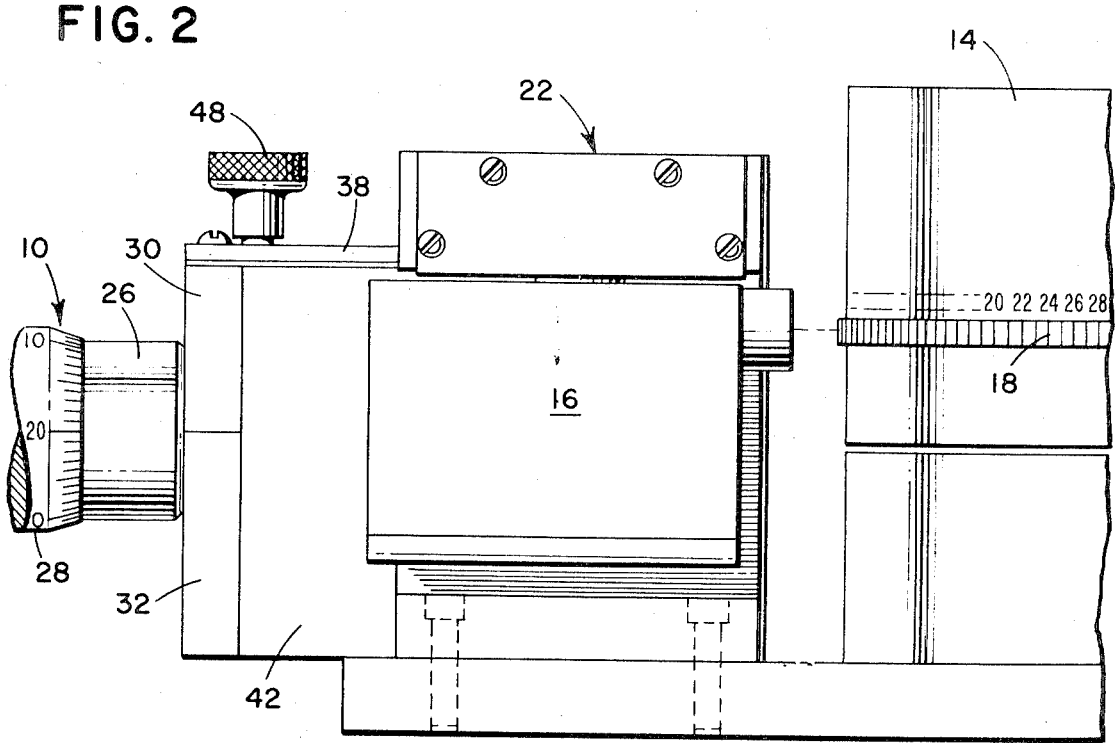
FIG. 3 is a right elevational view of the embodiment of FIG. 1.

Referring now to FIG. 2, the optical reader 16 magnifies the lines of the scale 18 on table 14, and the magnified lines are viewed in the window 78. In the illustrated embodiment, units representative of 0° and 1° are shown in the window with the opening of the fork 80 of the optical reader shown as approximately midway between the two units of scale 18. Suitable optical readers are commercially available. One suitable optical reader is known as the DOM-S optical reader and this instrument is available from Dr. Johannes Heidenhain, Optics and Electronics, Inc.

The optical reader is attached to the underside of the slide assembly 20 by recessed screws 82 or other suitable means. As seen in FIG. 5, this may be accomplished by inserting a suitable tool through access openings in cover plate 84 which forms part of the housing 22. The openings are thereafter normally closed by plugs 86.

Figure 6:
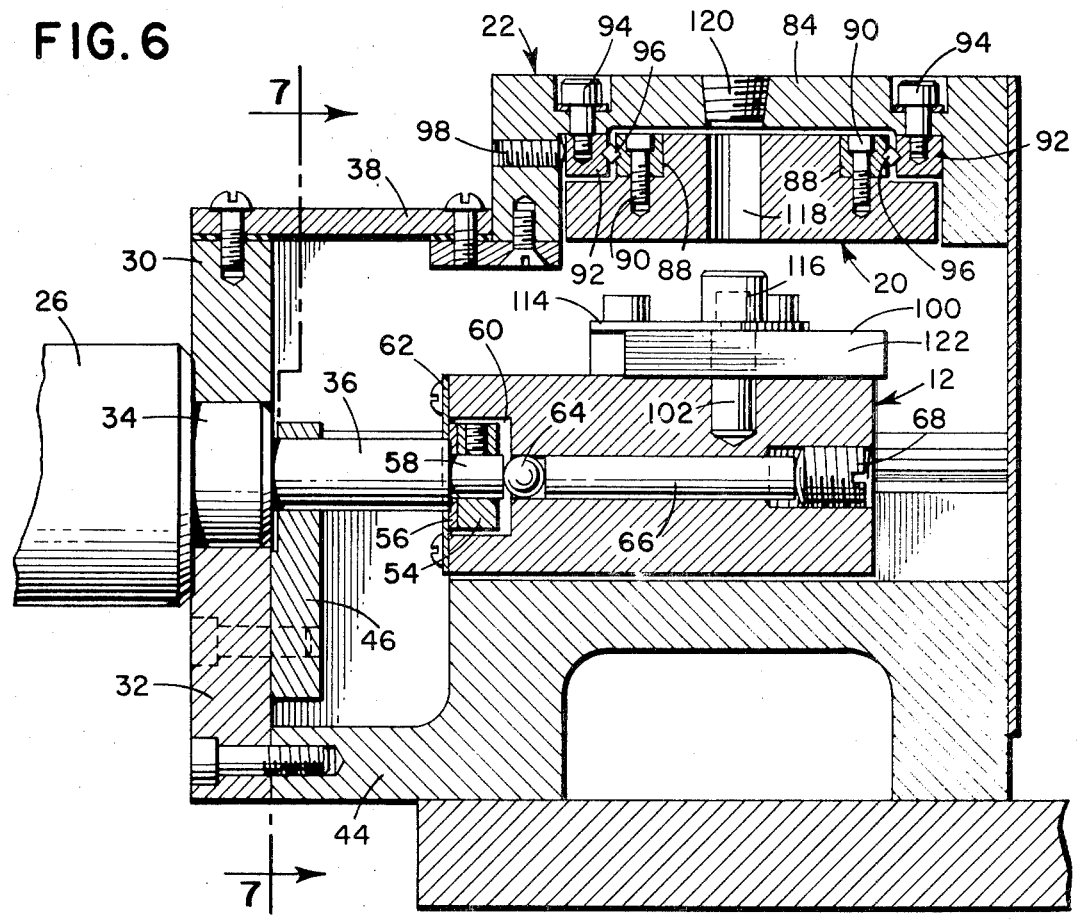
FIG. 6 is a vertical cross-sectional view taken on the line 6—6 of FIG. 4.

As shown in FIG. 6, the slide assembly 20 is positioned for reciprocation along an antifriction assembly comprising at each side an antifriction way 88 connected to the slide assembly 20 by screws 90, an adjacent antifriction way 92 connected to cover 84 by screws 94, and an antifriction rail 96 disposed in recesses provided in each pair of ways 88, 92. Setscrews 98 may be used to compensate for wear of the elements by making minor adjustments in the position of the ways.

Figure 4:
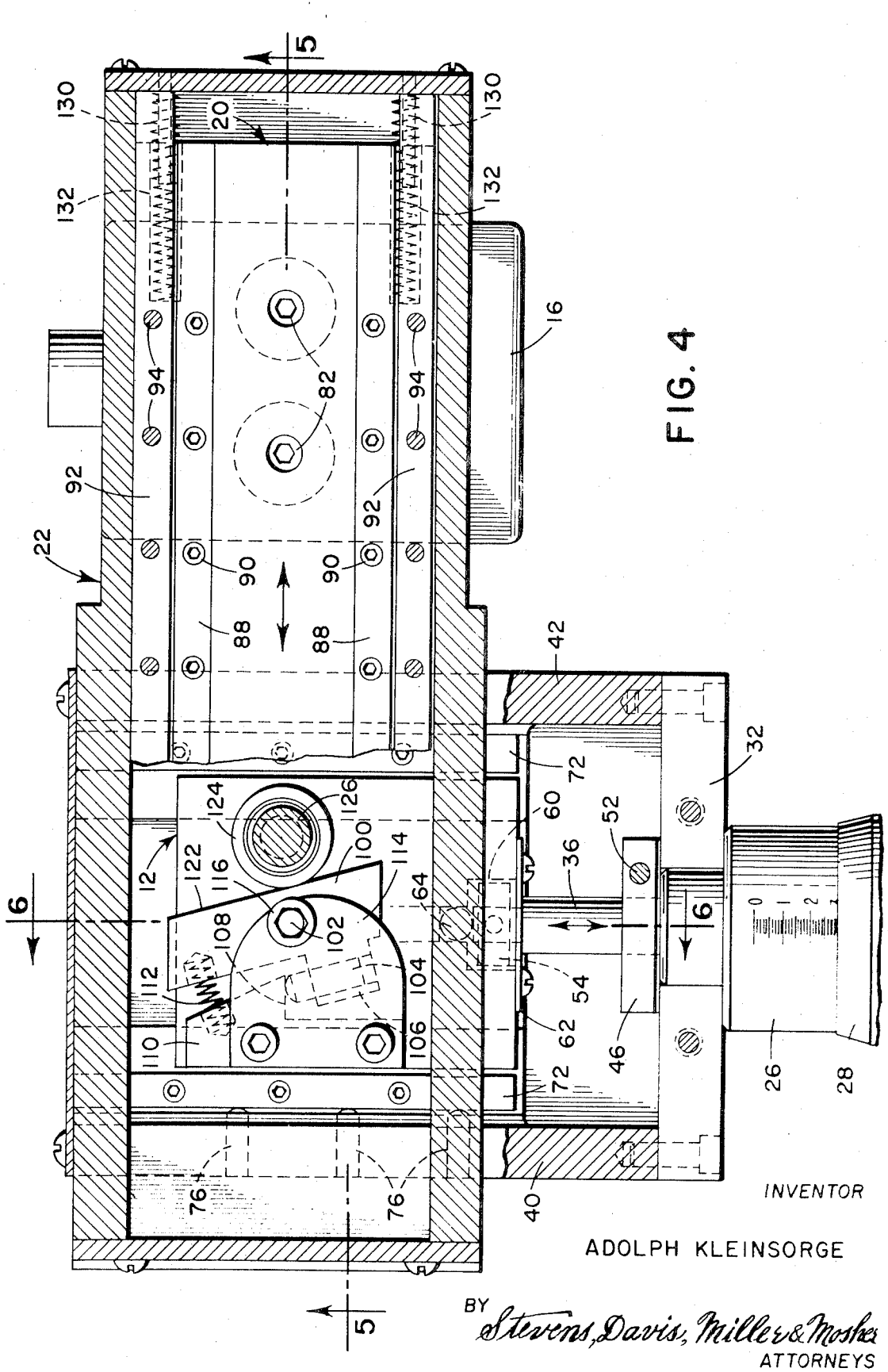
FIG. 4 is basically a horizontal cross-sectional view through the embodiment of FIG. 1 with portions of the structure broken away for the sake of clarity.

The mechanism for translating motion of the micrometer stem to reciprocation of the slide assembly 20 to which the optical reader is attached will now be described. The heart of this mechanism is an adjustable cam 100 which is mounted on the upper surface of carriage 12. The cam is pivotable about a pin 102 which is disposed in press fit engagement within a bore in the upper surface of carriage 12. A setscrew 104 which is threaded through an aperture in a projecting arm 106 of the cam abuts against the surface 108 of a fixed abutment block 110 as seen in FIGS. 1 and 4. A compression spring 112 is disposed within recesses in one end of cam 100 and in the adjacent end of the abutment block 110 to bias the cam about pin 102 so that the end of setscrew 104 is maintained in contact with the surface 108 of the abutment block. A retainer plate 114 is secured over most of cam 100 and abutment block 110, and a nut 116 which engages the threaded upper end of pin 102 rests upon retainer plate 114. Access to nut 116 is obtained via an aperture 118 in slide member 20 and a corresponding aperture in cover 84 which is normally closed by a plug 120.

The cam has a substantially flat cam surface 122 which is best seen in FIG. 4. The cam surface 122 is inclined in a non-right-angle relationship with respect to the direction of reciprocation of slide assembly 20. An annular bearing assembly 124 normally contacts the cam surface 122 with the bearing assembly being secured to the lower end of a bearing holder rod 126 which has its upper end wedged into a vertical bore 128 in the slide assembly 20.

A pair of compression springs 130 disposed in longitudinal bores 132 in the end of slide assembly 20 adjacent the optical reader bias the slide assembly to the left as seen in FIGS. 4 and 5 so that bearing assembly 124 is maintained in contact with the cam surface 122.

When initially calibrating the apparatus, micrometer 10 is set to its 0 position after proper alignments are made, and one of the lines of scale 18 on the rotary table 14 is centered in the fork 80 of the optical reader. The micrometer is then set to 60 minutes since in the case where the scales on the micrometer parts 26 and 28 are 0–60 minutes and 0–60 seconds respectively, this is the entire range of adjustment of the micrometer. If the next line on scale 18 does not now appear exactly centered in the fork of the optical reader, the position of cam 100 is adjusted by trial and error via setscrew 104 and the procedure repeated until the desired relationship is obtained and the assembly is ready for use.

In operation, assuming that the micrometer is adjusted to move the micrometer stem towards the rotary table 14, carriage 12 will be moved by the micrometer stem causing cam 100 to move in the direction towards the top of FIG. 4 with the result that the cam surface 122 as it moves pushes bearing assembly 124 and hence slide assembly 20 which carries the optical reader to the right as seen in FIG. 4. In like manner, retraction of the micrometer stem which causes movement of the cam 100 towards the micrometer will result in movement of slide 20 and hence of optical reader 16 in the opposite direction, that is, to the left as seen in FIG. 4.

What is claimed is:

1. An optical reader assembly for use with a rotary worktable having a scale around the periphery thereof comprising a movable optical reader for reading the scale on the worktable, a micrometer, means to translate movement of the stem of the micrometer into movement of said optical reader along the scale on the periphery of said worktable, and adjustment means to adjust the amount of movement of said optical reader relative to movement of the micrometer stem so that movement of said micrometer stem a preselected amount causes said optical reader to move a distance corresponding to a preselected scale value.

2. Apparatus according to claim 1, wherein said means to translate movement of said stem comprises a carriage reciprocated by said micrometer stem, said adjustment means include an adjustable cam connected to said carriage, and said optical reader has a slide member secured thereto to which is connected a cam-engaging means normally disposed in contact with said adjustable cam.

3. Apparatus according to claim 2, wherein said adjustable cam includes a substantially planar cam surface disposed at an incline with respect to the direction of travel of said slide member, and means to adjust the position of said cam surface to vary the incline of said cam surface relative to the direction of travel of said slide member.

4. Apparatus according to claim 2, wherein said slide member is positioned above said carriage.

5. Apparatus according to claim 2, wherein said adjustment means further comprise an abutment block secured upon said carriage, means biasing said cam towards said abutment block, and adjustable abutment means carried by said cam contacting said abutment block.

6. Apparatus according to claim 5, further comprising compression spring means biasing said slide member towards said cam so that said cam-engaging means contact said cam surface.

7. Apparatus according to claim 2, wherein aid carriage is positioned to reciprocate substantially radially with respect to the periphery of said worktable, and wherein said slide member is positioned to reciprocate in a direction substantially at right angles to the direction of reciprocation of said carriage.

8. Apparatus according to claim 1, wherein the scale on said worktable is divided into 360 units, and wherein said adjustment means are adjusted so that movement of said micrometer stem a preselected amount corresponding to a predetermined value as determined by a micrometer scale moves said optical reader one unit on the scale provided on said worktable.

9. Apparatus according to claim 8, further comprising means to lock said micrometer in any desired setting.

* * * * *